United States Patent [19]
Saberan et al.

[11] Patent Number: 5,527,065
[45] Date of Patent: Jun. 18, 1996

[54] DEPOLYMENT DOOR FOR USE IN A VEHICLE OCCUPANT RESTRAINT APPARATUS

[75] Inventors: Al A. Saberan, New Baltimore; William E. Gest, Troy; Rodger M. Cherry, Macomb Township, all of Mich.

[73] Assignee: TRW Vehicle Safety Systems Inc., Lyndhurst, Ohio

[21] Appl. No.: 348,058

[22] Filed: Dec. 1, 1994

[51] Int. Cl.$^6$ .................................................. B60R 21/16
[52] U.S. Cl. ........................ 280/728.3; 280/732
[58] Field of Search ........................ 280/728.2, 728.3, 280/732

[56] References Cited

U.S. PATENT DOCUMENTS

| | | | |
|---|---|---|---|
| 4,893,833 | 1/1990 | DiSalvo, et al. | 280/732 |
| 5,031,930 | 7/1991 | Sato | 280/732 |
| 5,060,972 | 10/1991 | Satoh et al. | 280/728.3 |
| 5,303,951 | 4/1994 | Goestenkors, et al. | 280/728.2 |
| 5,306,039 | 4/1994 | Nakayama | 280/728.1 |

Primary Examiner—Kenneth R. Rice
Attorney, Agent, or Firm—Tarolli, Sundheim, Covell, Tummino & Szabo

[57] ABSTRACT

An inflatable vehicle occupant restraint (18) has a stored condition and an inflated vehicle occupant restraining position. A support member (16) at least in part defines an opening (19) through which the vehicle occupant restraint (18) is deployed when inflated. A deployment door member (12) closes the opening (19). The support member (16) supports the deployment door member (12) at a first side of the opening (19) for pivotal movement relative to the support member upon inflation of the vehicle occupant restraint (18). The deployment door member (12) has a plurality of slots (95). The support member (16) includes a plurality of shear tabs (54) located at a second side of the opening (19) opposite the first side. Each shear tab (54) extends through a respective one of the slots (95) in the deployment door member (12). Each shear tab (54) shears through the material of the deployment door member (12) as the deployment door member pivots relative to the support member (16) upon inflation of the vehicle occupant restraint (18) to release the deployment door member at the second side of the opening (19) from the support member.

16 Claims, 3 Drawing Sheets

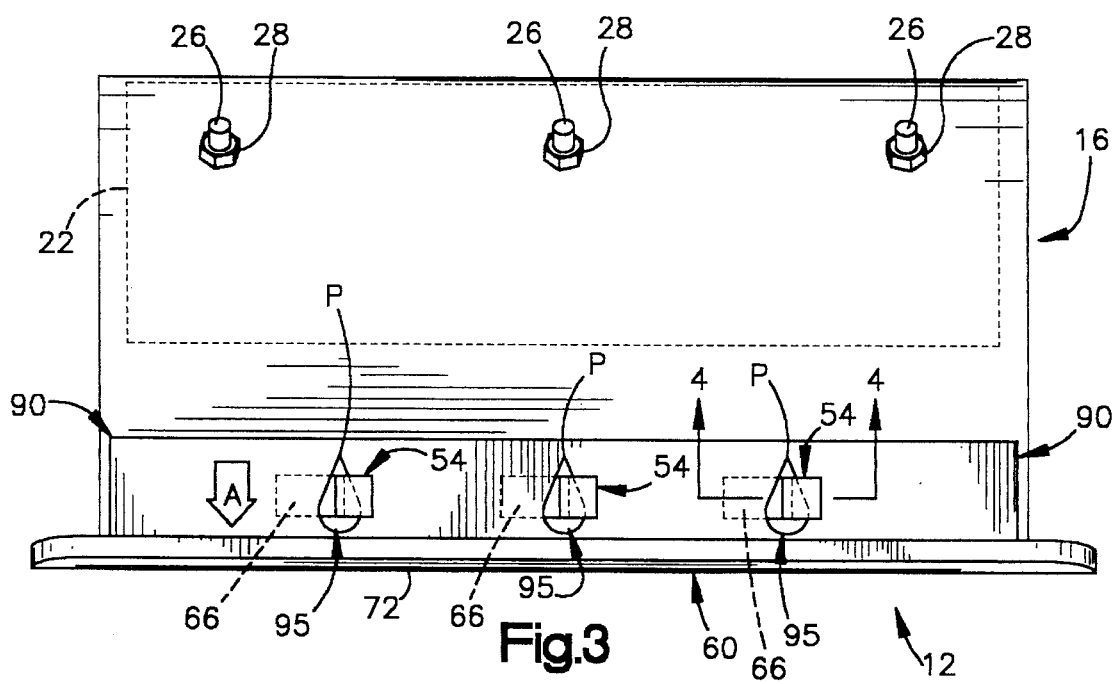
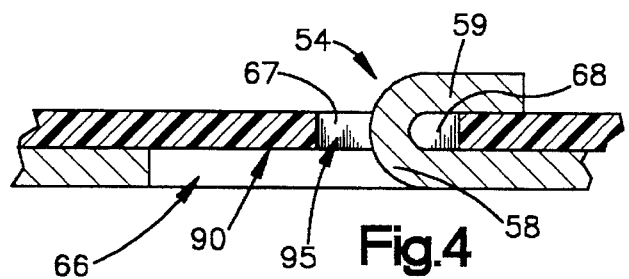
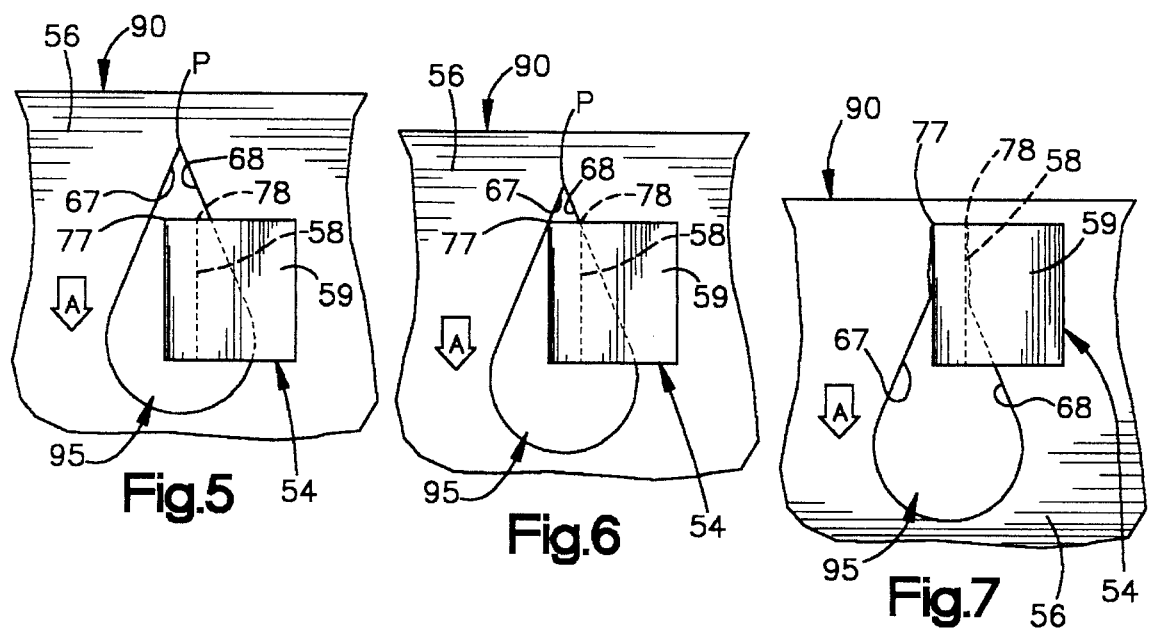

5,527,065

DEPLOYMENT DOOR FOR USE IN A VEHICLE OCCUPANT RESTRAINT APPARATUS

TECHNICAL FIELD

The present invention relates to a vehicle occupant restraint apparatus which includes an inflatable vehicle occupant restraint, such as an air bag, and particularly relates to a deployment door which covers an opening through which the inflatable vehicle occupant restraint is deployed upon inflation of the inflatable vehicle occupant restraint.

BACKGROUND ART

Deployment doors for use in an inflatable vehicle occupant restraint apparatus are known. A deployment door forms an interior portion of the vehicle, such as a portion of the instrument panel or the interior of the vehicle door, depending upon where the inflatable vehicle occupant restraint is mounted. A deployment door covers an opening through which an inflatable vehicle occupant restraint, such as an air bag, is deployed upon inflation of the air bag. When the air bag inflates, the air bag presses against the deployment door to open the door by pivoting the door from a closed position to an open position.

SUMMARY OF THE INVENTION

In accordance with the present invention, an inflatable vehicle occupant restraint apparatus comprises an inflatable vehicle occupant restraint having a stored condition and an inflated vehicle occupant restraining position. A support member at least in part defines an opening through which the vehicle occupant restraint is deployed when inflated. A deployment door member closes the opening. The support member supports the deployment door member at a first side of the opening for pivotal movement relative to the support member. One of these two members includes at least one shear tab. The other of the members at a second side of the opening opposite the first side has at least one slot receiving the shear tab. As the inflatable vehicle occupant restraint inflates, it presses on the deployment door, and the deployment door pivots at the first side of the opening relative to the support member. As the deployment door pivots, the shear tab shears through the material of the other member to release the deployment door member at the second side of the opening from the support member.

Preferably, the slot is in the deployment door member and is defined by surfaces which converge as they extend in a direction opposite the direction of deployment of the inflatable vehicle occupant restraint. The shear tab is on the support member and has portions which engage the converging surfaces and split the deployment door member apart as the deployment door member pivots in response to deployment of the inflatable vehicle occupant restraint.

Further, in accordance with the present invention, the inflatable vehicle occupant restraint is an air bag having a stored condition located in a reaction canister. A source of inflation fluid for inflating the air bag is also located in the reaction canister. The deployment door member is attached to the reaction canister and closes an opening in the reaction canister through which the air bag is deployed when the air bag is inflated.

BRIEF DESCRIPTION OF THE DRAWINGS

Further features of the present invention will become apparent to those skilled in the art to which the present invention relates from reading the following specification with reference to the accompanying drawings, in which:

FIG. 3 is a view taken approximately along line 3—3 of FIG. 2;

FIG. 4 is a sectional view taken approximately along line 4—4 of FIG. 3;

FIG. 5 is an enlarged view of a portion of FIG. 3;

FIG. 6 is a view similar to FIG. 5 but showing parts in a different position;

FIG. 7 is a view similar to FIG. 6 but showing parts in still a different position.

DETAILED DESCRIPTION OF A PREFERRED EMBODIMENT

Figure 1:
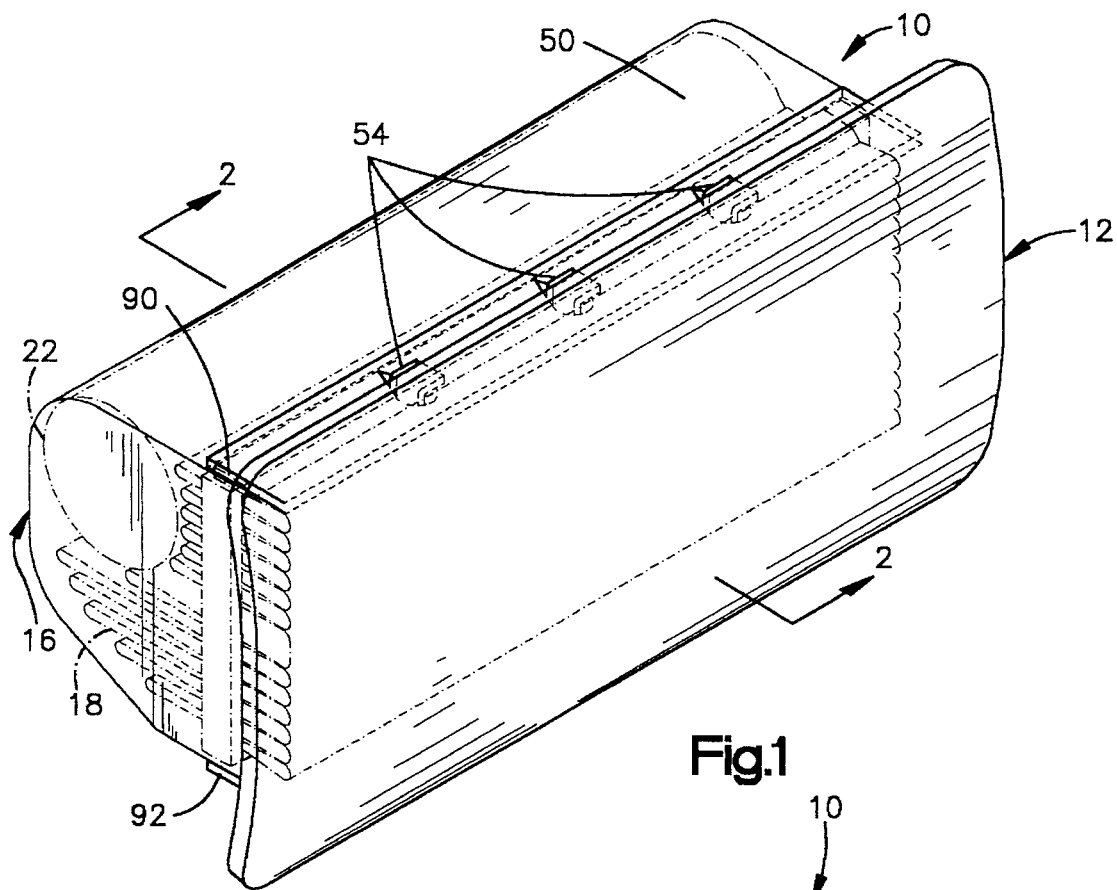
FIG. 1 is a schematic perspective view of a vehicle occupant restraint apparatus incorporating a deployment door constructed in accordance with the present invention.
Figure 2:
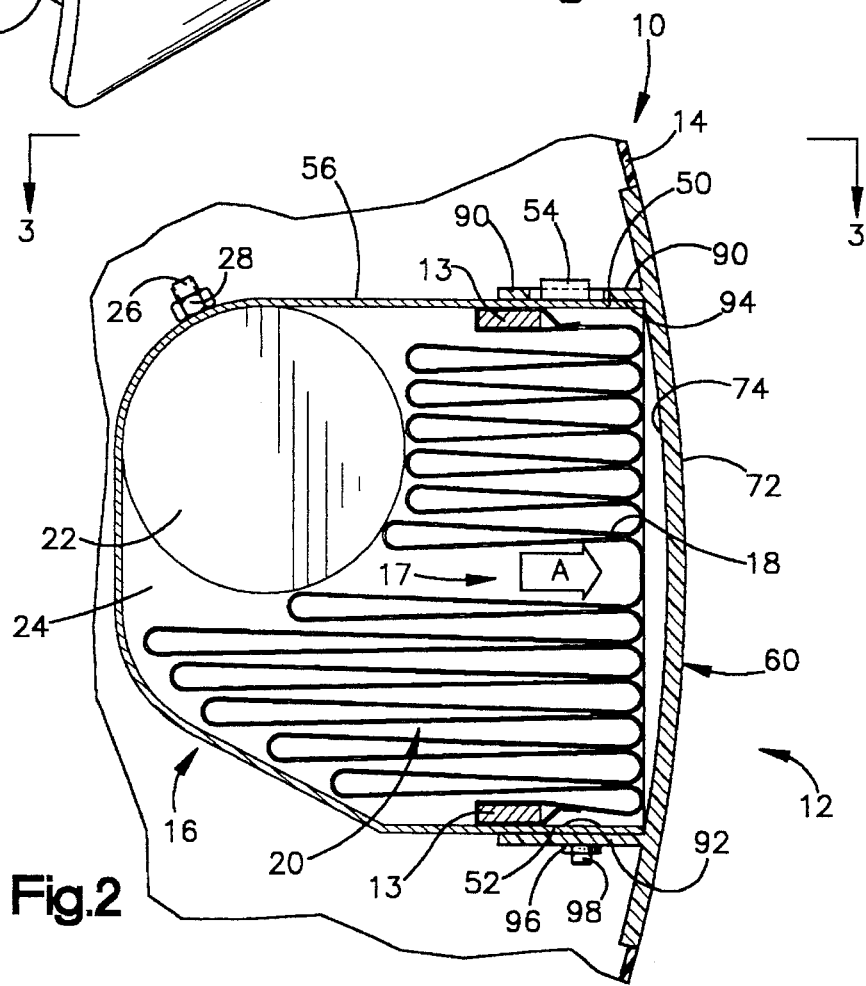
FIG. 2 is a sectional view taken approximately along line 2—2 of FIG. 1.

FIGS. 1 and 2 illustrate a vehicle occupant restraint apparatus 10 that comprises an inflatable air bag 18 and an air bag reaction canister 16. The reaction canister 16 is secured to the vehicle by any suitable means, such as a bracket structure and fasteners (not shown). The reaction canister 16 includes a top wall portion 50 and a bottom wall portion 52 (FIG. 2). Preferably, the reaction canister 16 is made of metal.

The air bag 18 is wrapped around and secured to a retaining ring 13 (FIG. 2) in a known manner. The retaining ring 13 is securely attached to the reaction canister 16 by suitable fasteners (not shown). The air bag 18 is, therefore, securely attached to the reaction canister 16.

The air bag 18 has an opening 17 (FIGS. 2 and 8) through which inflation fluid can flow into the interior of the air bag 18 to inflate the air bag. An actuatable inflator 22 is secured in a chamber portion 24 of the reaction canister 16. The inflator 22 may be secured in any suitable manner to the reaction canister 16. As illustrated by way of example in the drawings, the inflator 22 has a threaded stud 26 which extends through a wall portion of the reaction canister 16. A nut 28 is screwed onto the stud 26 to attach the inflator 22 securely to the reaction canister 16.

The air bag 18 is folded and stored in an air bag storage compartment 20 of the reaction canister 16. The folded and stored air bag 18 is deployed into the vehicle passenger compartment (in the direction of arrow A shown in FIGS. 2 and 3) upon occurrence of a vehicle collision requiring air bag deployment. The reaction canister 16 has an opening 19 (FIG. 8) through which the air bag 18 is deployed. The reaction canister 16 is mounted in the vehicle instrument panel 14. However, it is contemplated that the air bag 18 may be folded and stored in an air bag storage compartment at a different location in the vehicle.

A deployment door 12 closes the opening 19 through which the air bag 18 is deployed into the vehicle passenger compartment. The deployment door 12 forms a portion of the vehicle instrument panel 14. The deployment door 12 is preferably aligned flush with the vehicle instrument panel 14 when the door 12 is in the closed position.

The deployment door 12 can be of any suitable construction. As illustrated, the deployment door 12 comprises a single material layer 60 including a curved outer surface 72 which is exposed to the vehicle compartment. The layer 60 also includes a curved inner surface 74 which is engaged by the air bag 18 when the air bag 18 is inflated. Preferably, the layer 60 is made of a molded thermoplastic material.

The deployment door 12 includes a bottom flange portion 92 extending away from the inner surface 74. The bottom flange portion 92 is secured to the bottom wall portion 52 of the reaction canister 16 using suitable fasteners, such as a series of nuts 96 and bolts 98, as shown in FIG. 2. The deployment door 12 further includes a top flange portion 90 extending away from the inner surface 74.

The top flange portion 90 of the deployment door 12 has an inner surface 94 (FIG. 2) which is clamped against a portion of the outer surface 56 of the top wall portion 50 of the reaction canister 16 to secure the top flange portion 90 of the deployment door 12 to the reaction canister 16. The clamping is achieved by a plurality of shear tabs 54 connected to the reaction canister 16. The top wall portion 50 of the reaction canister 16 includes the plurality of shear tabs 54 (three of which are shown in FIGS. 1 and 4). The shear tabs 54 are in the form of projections which extend away from an outer surface 56 of the top wall portion 50 of the reaction canister 16.

The structure of each shear tab 54 is the same as the other shear tabs. For simplicity, only one shear tab 54 will be described in detail. Preferably, each of the shear tabs 54 is stamped out from the top wall portion 50 of the reaction canister 16. When each shear tab 54 is stamped from the top wall portion 50 of the reaction canister 16, a rectangular opening 66 (FIGS. 3 and 4) is created in the top wall portion 50. Each shear tab 54 includes a curved stem portion 58 which extends away from the outer surface 56 of the top wall portion 50 of the reaction canister 16. A flange portion 59 extends away from the stem portion 58 parallel with and spaced apart from the outer surface 56 of the top wall portion 50.

The top flange portion 90 of the deployment door 12 has a plurality of slots 95 (best shown in FIG. 3). Each of the slots 95 has the shape of a teardrop as best shown in FIGS. 3 and 5. The number of slots 95 is the same as the number of shear tabs 54, which is three, as shown in FIG. 3. The slots 95 are identical. For simplicity, only one slot will be described in detail with reference to the slot 95 shown in FIGS. 4 and 5.

The slot 95 is in a portion of the top flange portion 90 of the deployment door 12 which is of uniform thickness. This portion of uniform thickness extends entirely around the slot 95. The slot 95 is defined in part by two surfaces 67, 68 which converge at a point P as the surfaces 67, 68 extend in a direction which is opposite the direction of deployment of the air bag 18 (i.e., opposite the direction of arrow A in FIGS. 2 and 3). The stem portion 58 of the shear tab 54 extends through the slot 95 and has a rectangular cross-section (as best shown in Figs. 4 and 5) with two corners 77, 78 (FIG. 5) which are engageable with the converging surfaces 67, 68, respectively. The flange portion 59 of each shear tab 54 is crimped against the top flange portion 90 of the deployment door 12. The flange portion 59 thereby clamps the inner surface 94 of the top flange portion 90 of the deployment door 12 against a portion of the outer surface 56 of the top wall portion 50 of the reaction canister 16.

When a vehicle collision requiring air bag deployment occurs, inflation fluid is directed from the inflator 22 through the opening 17 into the interior of the air bag 18 to inflate the air bag. As the air bag 18 inflates, the air bag presses against the inner surface 74 of the layer 60. The force of the inflating air bag overcomes the clamping force of the shear tabs 54 acting on the top flange portion 90, and the air bag 18 pushes layer 60 in the direction of arrow A in FIGS. 2 and 3. When this occurs, the converging surfaces 67, 68 of the top flange portion 90 of the layer 60 move from their initial position shown in FIG. 5 into an engagement position shown in FIG. 6 with the two corners 77, 78 of the stem portion 58 of the shear tab 54. The converging surface 67 moves into engagement with the corner 77 and the converging surface 68 moves into engagement with the corner 78.

The pressure of the air bag 18 against the inner surface 74 continues to increase until the pressure is sufficient to cause the material of the layer 60 in the vicinity of point P of the converging surfaces 67, 68 to split apart, as shown in FIG. 7. The material of the layer 60 splits apart in the vicinity of point P because of increasing pressure between the converging surfaces 67, 68 and the stem portion 58 of the shear tab 54.

Figure 8:
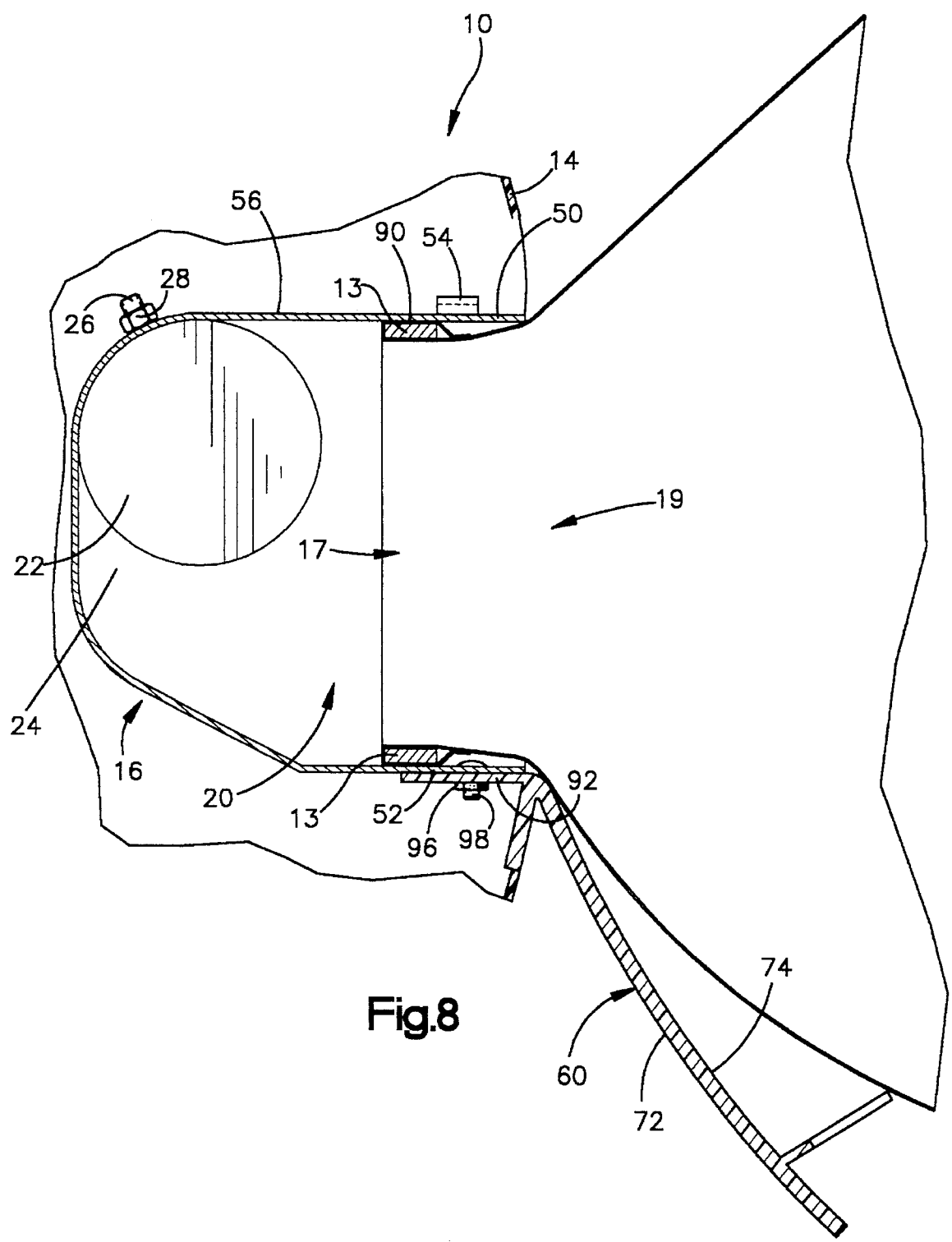
FIG. 8 is a view similar to FIG. 2 but showing parts in a different position.

After the material of the layer 60 splits apart in the vicinity of point P, the deployment door 12 is released at the top flange portion 90, and the deployment door 12 pivots about the bottom flange portion 92 of the deployment door. The air bag 18 continues to press against the inner surface 74 to pivot the deployment door 12 from the closed position shown in FIG. 2 to an open position such as shown in FIG. 8. As the deployment door 12 pivots to its open position, the opening 19 is uncovered, and the air bag 18 is deployed (in the direction of arrow A shown in FIG. 8) through opening 19 into the vehicle passenger compartment. Thus, the material of the layer 60 splits apart and the deployment door 12 pivots to an open position to enable deployment of the air bag 18 into the vehicle passenger compartment in response to a vehicle collision.

From the above description of the invention, those skilled in the art to which the present invention relates will perceive improvements, changes and modifications. Such improvements, changes and modifications within the skill of the art to which the present invention relates are intended to be covered by the appended claims. Also, although the deployment door 12 illustrated in FIG. 1 forms a portion of the vehicle instrument panel 14, it is contemplated that a deployment door constructed in accordance with the present invention may form a portion of the interior of a vehicle door for covering an air bag located in the vehicle door. Further, it is contemplated that features of the present invention may be used in a cover on a vehicle steering wheel for covering an air bag located on the steering wheel. Thus, the term "deployment door" as used in this application is also intended to mean the cover for an air bag mounted on a steering wheel.

Having described the invention, the following is claimed:

1. An inflatable vehicle occupant restraint apparatus comprising:

an inflatable vehicle occupant restraint having a stored condition and an inflated vehicle occupant restraining position;

a support member at least in part defining an opening through which said vehicle occupant restraint is deployed when inflated;

a deployment door member closing said opening, said support member supporting said deployment door member at a first side of said opening for pivotal movement relative to said support member upon inflation of said vehicle occupant restraint;

one of said members including at least one shear tab and the other of said members at a second side of said opening opposite said first side having at least one slot receiving said shear tab on said one member; and said shear tab comprising means for shearing through the material of said other member as said deployment door member pivots relative to said support member upon inflation of said vehicle occupant restraint to release said deployment door member at said second side of said opening from said support member.

2. An inflatable vehicle occupant restraint apparatus according to claim 1 wherein said slot is in said deployment door member and is defined by surfaces which converge as they extend in a direction opposite the direction of deployment of said inflatable vehicle occupant restraint, and said shear tab is on said support member and has portions which engage said converging surfaces and split said deployment door member apart as said deployment door member pivots in response to deployment of said inflatable vehicle occupant restraint.

3. An inflatable vehicle occupant restraint apparatus according to claim 2 wherein said shear tab is rectangular in cross section and has corners which comprise said portions which engage said converging surfaces.

4. An inflatable vehicle occupant restraint apparatus according to claim 1 wherein said slot is in a portion of said deployment door member which is of uniform thickness, said portion of said deployment door member extending entirely around said slot.

5. An inflatable vehicle occupant restraint apparatus according to claim 1 wherein said support member comprises a reaction canister, and further comprises means securing said inflatable vehicle occupant restraint to said reaction canister, and said shear tab comprises a projection from said reaction canister which extends through said slot.

6. An inflatable occupant restraint apparatus according to claim 1 wherein said shear tab comprises a first portion extending through said slot and a second portion clamping against a surface of said deployment door member to secure said deployment door member to said support member.

7. An inflatable vehicle occupant restraint apparatus according to claim 1 wherein said slot has the shape of a teardrop, said slot being defined by two surfaces which converge at a point.

8. An inflatable vehicle occupant restraint apparatus according to claim 1 wherein said shear tab clampingly engages said members to each other.

9. An inflatable vehicle occupant restraint apparatus comprising:

an inflatable vehicle occupant restraint having a stored condition and an inflated vehicle occupant restraining position;

a support member at least in part defining an opening through which said vehicle occupant restraint is deployed when inflated;

a deployment door member closing said opening, said support member supporting said deployment door member at a first side of said opening for pivotal movement relative to said support member upon inflation of said vehicle occupant restraint, said deployment door member having a plurality of slots;

said support member including a plurality of shear tabs located at a second side of said opening opposite said first side, each shear tab extending through a respective one of said slots in said deployment door member and shearing through the material of said deployment door member as said deployment door member pivots relative to said support member upon inflation of said vehicle occupant restraint to release said deployment door member at said second side of said opening from said support member.

10. An inflatable vehicle occupant restraint apparatus according to claim 9 wherein each slot is in a portion of said deployment door member which is of uniform thickness, said portion of said deployment door member extending entirely around said slot.

11. An inflatable vehicle occupant restraint apparatus according to claim 9 wherein said support member comprises a reaction canister, and further comprises means securing said inflatable vehicle occupant restraint to said reaction canister, and said shear tab comprises a projection from said reaction canister which extends through said slot.

12. An inflatable occupant restraint apparatus according to claim 9 wherein each shear tab comprises a first portion extending through the respective slot and a second portion clamping against a surface of said deployment door member to secure said deployment door member to said support member.

13. An inflatable vehicle occupant restraint apparatus according to claim 9 wherein each slot in said deployment door member is defined by surfaces which converge as they extend in a direction opposite the direction of deployment of said inflatable vehicle occupant restraint, and each shear tab of said support member has portions which engage said converging surfaces and split said deployment door member apart as said deployment door member pivots in response to deployment of said inflatable vehicle occupant restraint.

14. An inflatable vehicle occupant restraint apparatus according to claims 13 wherein each shear tab is rectangular in cross section and has corners which comprise said portions which engage said converging surfaces.

15. An inflatable vehicle occupant restraint apparatus according to claim 1 wherein said slot has the shape of a teardrop, said slot being defined by two surfaces which converge at a point.

16. An inflatable vehicle occupant restraint apparatus comprising:

an inflatable vehicle occupant restraint having a stored condition and an inflated vehicle occupant restraining position;

a support member at least in part defining an opening through which said vehicle occupant restraint is deployed when inflated;

a deployment door member closing said opening, said support member supporting said deployment door member at a first side of said opening for pivotal movement relative to said support member upon inflation of said vehicle occupant restraint;

one of said members including at least one shear tab and the other of said members at a second side of said opening opposite said first side having at least one slot receiving said shear tab on said one member; and said shear tab comprising means movable through the material of said other member to shear said material as said deployment door member pivots relative to said support member upon inflation of said vehicle occupant restraint to release said deployment door member at said second side of said opening from said support member.

* * * * *

UNITED STATES PATENT AND TRADEMARK OFFICE
CERTIFICATE OF CORRECTION

PATENT NO. : 5,527,065
DATED : June 18, 1996
INVENTOR(S) : Al. A. Saberan, William E. Gest, and Rodger M. Cherry It is certified that error appears in the above-indentified patent and that said Letters Patent is hereby corrected as shown below:

Column 6, line 38, change "1" to --9--.

Signed and Sealed this

First Day of October, 1996

Attest:

BRUCE LEHMAN

Attesting Officer

Commissioner of Patents and Trademarks